3,238,064
METHOD FOR PURIFYING AMYLOSE
David P. Macarus and Celestian L. Royal, Decatur, Ill., assignors to A. E. Staley Manufacturing Company, Decatur, Ill., a corporation of Delaware
No Drawing. Filed Oct. 9, 1963, Ser. No. 314,884
18 Claims. (Cl. 127—69)

This invention relates to the purification of amylose. More particularly this invention relates to the removal of fat from amylose.

Ordinary starch is known to consist of two types of polymers of glucose, the linear polymer called amylose (sometimes referred to as the "A fraction") and the branched chain polymer called amylopectin (sometimes referred to as the "B fraction"). The relative content of amylose and amylopectin varies with the source of the starch. For example, depending somewhat on the analytical technique used, it has been estimated that tapioca contains about 17–21% amylose, potato starch 22–25%, corn starch 22–30%, and so on. The amylose molecule is considered to be a long, linear chain of anhydroglucose units. The amylopectin molecule, on the other hand, is considered to be a larger complex chain of tree-like structure with many of the branches themselves having branches and so on.

For many years attempts have been made to provide an economical method for separating the starch fractions. Processes using complexing agents such as butanol have proved relatively successful. A recent patent, U.S. 3,067,067 to J. A. Wagoner et al., discloses an especially economical method in which no complexing agent is utilized. A common drawback of starch separation processes is that the amylose which is recovered contains a considerable part of the non-carbohydrate materials associated with the starch from which the amylose is recovered. The principal non-carbohydrate is fatty material. When either corn starch or sorghum starch is the raw material source, the separated amylose usually contains from about 1.5 to 2.5% by weight of fatty material. When potato starch is the raw material source the separated amylose contains a much smaller amount of fatty material, generally on the order of 0.05% by weight. Amylose derived from other starch sources generally contains fatty material in the range of 0.5 to 2.0% by weight. The presence of fatty impurities and other impurities such as nitrogenous material, inorganic material and as yet unidentified insoluble impurities restricts the use of commercial amylose in situations where a product of high purity is desired.

The principal object of the present invention is to provide a method for purifying amylose.

An additional object of our invention is to provide a method for obtaining substantially fat-free amylose from starch sources containing a relatively high amount of fat.

The word "starch" is used herein in a generic sense. Any variety of starch or mixtures of starch may be employed to obtain the amylose to be purified in our process, including corn, rice, wheat, tapioca, sago, sorghum, potato, etc. and the like. Where removal of fatty material is the principal object, our process is most advantageously applied to amylose obtained from corn starch or sorghum starch, simply because they contain high proportions of fatty impurities.

For the purpose of our invention the word "amylose" is taken to include amylose resulting from the fractionation of the amylose and amylopectin fractions of starch, whole starch which is composed of at least 50% amylose, amylose which has been reduced in molecular weight by hydroylsis or hydrolytic oxidation and amylose which has formed derivatives such as esters and ethers by reaction of the amylose hydroxyl groups with derivatizing agents. Typical derivatizing agents are disclosed in U.S. Patent 3,038,895.

Generally stated, our process is carried out by first separating starch into an amylopectin rich fraction and an amylose rich fraction. This can be accomplished according to the process disclosed in the Wagoner et al. patent. The patented process is preferred chiefly because of its efficiency in economically obtaining amylose. Briefly stated, the process of the patent is carried out by forming a fluid solution of starch and water by heating it above 250° F. while regulating the temperature and time of heating to avoid degradation of the starch. The fluid solution is then cooled below the atmospheric boiling point and above about 120° F. while the concentration of the starch dry substance in the cooled solution is maintained at more than about 2.5% by weight and the temperature is maintained in a range between about 120° F. and the atmospheric boiling point of water for a period of time sufficient to stabilize the solution. During this period of time a separable amylose-rich solid fraction is formed and grown. The amylose-rich solid fraction is then separated from the stable solution and is recovered in the solid form. The amylopectin remains dissolved in the stable solution and can then be recovered by any suitable means.

After fractionation of the starch, a fluid solution of the amylose is effected in water at elevated temperatures in the presence of a water-insoluble fat-sorbing, filter-aid material which is inert to the amylose. The fat-sorbing filter-aid is then separated from the fluid solution and purified amylose is recovered from the fluid solution.

We have discovered that by our process as much as 95% of the fat present in the amylose can be removed. In addition, the levels of nitrogenous impurities, dimethyl sulfoxide-insoluble impurities and inorganic impurities can also be greatly reduced.

In the solution-forming step of our process, the temperature required to place the amylose in solution will vary depending mainly on the water solubility of the particular form of amylose to be purified. For example, amylose which has been separated from starch by means of an alcohol complexing agent (butanol, for example), or amylose which has been reduced in molecular weight, will tend to be water soluble at temperatures lower than those at which unmodified amylose which has not been separated with a complexing agent is soluble. Temperatures of about 150° F. can often be satisfactorily utilized for the more readily water-soluble amylose materials. When amylose which is of low water solubility, such as the amylose obtained according to the Wagoner et al. process, is purified by our process, it is necessary to employ temperatures of 250° F. and above. The temperatures above 250° F. and the time at the temperatures throughout our process both should be regulated to avoid degradation of the amylose. The higher the temperature or the longer the holding time at the temperature, the greater is the tendency for the amylose to be degraded. At a minimum the amylose in water mixture must be heated until all of the amylose is in solution. Generally it has been found that temperatures between about 250° F. and 350° F. may be used when heating times ranging from 1 to 30 minutes are employed. Temperatures in excess of 370° F. should be avoided.

It is desirable in our process, when temperatures above the atmospheric boiling point of water are employed, to bring the water mixture containing the impure amylose to temperature as rapidly as possible and for this purpose an apparatus of the type disclosed in application Serial No. 790,487, now U.S. Pat. No. 3,101,284 filed February 12, 1959 for O. R. Etheridge, may be used. In this apparatus, steam at superatmospheric pressure is continuously mixed with the water-amylose mixture in the throat of a steam jet. In this way the desired temperature is reached virtually instantaneously and a fluid solution is obtained in a matter of a few seconds. In the apparatus of the patent application referred to, the steam-heated suspension flows downward, into and through a detention zone where the hot suspension is maintained at an elevated temperature for a period of time that is selectable. This apparatus is so arranged and constructed that there is substantially no mixing in the detention zone in order that the amylose solution withdrawn from the bottom of the detention zone be maintained at a uniform temperature for a uniform length of time. Other forms of this type of apparatus may also be used for heating, for example of the types disclosed in U.S. Patent Nos. 2,871,146, 2,582,198 and 2,805,966 (Etheridge).

Other methods may be used in heating the water-amylose mixture. We can employ an autoclave, or we can pump our mixture through a heat exchanger which comprises a coil of tubing in a constant temperature environment. The resulting fluid solution can then be transferred to a detention vessel and maintained at a selectable temperature for a suitable amount of time.

In order to obtain satisfactory purification, it is necessary to treat the amylose with sorbent filter aid while all the amylose is in solution. Therefore, the temperature of the solution must be sufficient to prevent formation of solid amylose. The temperature required to prevent formation of solid amylose depends on the water solubility of the amylose and on the concentration of amylose in the solution. We have found that even at amylose concentrations of around 20% a temperature of 200° F. is generally sufficient to prevent formation of solid amylose. Lower temperatures, of course, can be utilized when lower concentrations of amylose and/or amylose of greater water solubility are employed. For optimum purification results, we have found that temperatures of 250° F. and above are preferably employed when amylose concentrations of 10% or more are utilized.

For convenience and also for optimum purification, it is preferable to form the amylose solution in the presence of the sorbent filter aid. For this purpose temperatures of 250° F. are preferred and it is preferred that the temperature be maintained until the fluid solution is separated from the sorbent filter aid. Satisfactory results can also be obtained by adding the sorbent filter aid to the amylose solution after formation of the solution.

The amount of amylose that can be satisfactorily purified in our process will vary depending mainly on the temperatures of the amylose solution. We have found that amylose solutions containing more than 25% by weight amylose based on the weight of the water are highly viscous even at temperatures ranging from 250° F.–350° F. and thus cannot be satisfactorily purified by our process. When temperatures above 250° F. are utilized completely satisfactory purification results can be obtained when aqueous solutions containing up to 20% by weight amylose dry substance based on the weight of the water in the solution are employed. The viscosity of amylose solutions containing amounts of amylose less than about 10% at temperatures lower than 250° F. is sufficiently low to permit satisfactory purification providing, of course, all of the amylose is in solution. However, when amounts of amylose greater than 10% are treated at temperatures below about 250° F. the efficiency of our process is adversely affected. It is generally uneconomical to use solutions containing less than 3–5% amylose.

The fat-sorbing filter aid which may be employed in our process must be inert to amylose and must be highly insoluble in water even at the elevated temperatures of the process. Included among these sorbent filter aids are diatomaceous earths, fibrous asbestos, fibrous wood cellulose, activated carbon, the clays such as bentonite and the montmorillinite families of clays, combinations of the aforementioned and the like.

The amount of sorbent filter aid which should be utilized in order to obtain completely satisfactory purification will vary depending primarily on the levels of impurities in the amylose. When amylose having a low level of impurities is subjected to our process, as low as 0.1% by weight sorbent filter aid based on the weight of the amylose may be satisfactorily employed. However, it is preferred to utilize from about 1 to about 15% by weight sorbent filter aid for we have found that amounts in this range serve to satisfactorily purify amylose samples which have a very high level of non-carbohydrate materials. While much higher amounts of sorbent filter aid may be employed, it is uneconomical to do so.

The sorbent filter aid may then be separated from the fluid solution by any convenient means. In order to obtain satisfactory purification it is also necessary that no solid amylose be formed during the separation procedure. As previously stated, the temperature of the fluid solution must be maintained at a level sufficient to prevent formation of solid amylose. We have found that optimum purification and efficient separation are obtained when solution temperatures of 250° F. and above are employed. While not being limited to any particular theory, it is believed that the lower viscosities of the amylose solutions at these elevated temperatures permit optimum sorption of fats and other impurities on the sorbent filter aid. When separation temperatures below those requiring use of superatmospheric pressures are employed, either centrifugation or filtration separation methods may be used. However, when separation is effected at temperatures requiring elevated pressures, filtration is the more convenient separation procedure.

After removal of the sorbent filter aid from the fluid solution amylose can be recovered by methods which will be described later.

In an alternative procedure for purifying amylose, the fluid solution containing the amylose may be passed through a bed of sorbent filter aid without having been previously treated with the sorbent filter aid as described above. The temperatures utilized in the previously described preferred method should also be employed in this alternative method. While this alternative method is operative in removing impurities from the amylose solution, it is not as effective as the previously described preferred method and should be avoided when optimum purification of amylose is desired.

The solid amylose is conveniently recovered from its aqueous solution by cooling the solution to just below its boiling point and then spray drying or roll drying the solution.

In another procedure for recovering amylose from the fluid solution the amylose can be cooled to the boiling point and then be immediately precipitated in an organic, water-miscible solvent in which amylose is insoluble without going through the long cooling procedure. Such solvents include pyridene, lower alcohols, for example methanol, ethanol or propanol, a lower ketone, for example methyl ethyl ketone or acetone, etc. and the like. The organic solvent can then be removed from the precipitated amylose by any suitable means to obtain dry solid amylose.

The following examples illustrate the method of our invention but they are not intended as a limitation of the invention.

In the examples, several procedures are referred to for quantitatively determining impurities in amylaceous materials. The amount of fatty materials in the examples is determined by the well-known "fat by hydrolysis" test which is described in Kerr, Chemistry & Industry of Starch, Academic Press (1950) on page 671. The nitrogen determination is made by the Kjeldahl method. The amount of insoluble debris is determined by dissolving a 1-gram sample of amylose in 100 ml. of a mixture consisting 85 ml. of dimethyl sulfoxide and 15 ml. of water at 50° C. The material is then filtered and the filtered solids are washed with 10 ml. of aqueous dimethyl sulfoxide containing the same percentage of dimethyl sulfoxide as the 100 ml. mixture. The thus-obtained material is then dried under vacuum and weighted. The percent insolubles is calculated by using the following formula:

$$\frac{\text{weight of dried solids}}{\text{weight of amylose sample}} \times 100 = \text{Percent Insolubles}$$

The amount of inorganic material is determined by the well-known sulfate ash test. Briefly this test is conducted by treating a weighed sample of amylose with sulphuric acid and then heating the sample in a furnace at about 600° C. The incombustible residue which remains is then weighed. The percent of inorganic impurities expressed as sulfate ash is calculated using the following formula:

$$\frac{\text{weight of incombustibles}}{\text{weight of amylose sample}} \times 100 = \text{Percent sulfate ash}$$

EXAMPLE I

A sample of amylose obtained from corn starch according to the method of Wagoner et al. was analyzed and found to contain 2.27% fat, 0.35% inorganic impurities, 0.3% dimethyl sulfoxide insoluble impurities, and 0.06% nitrogen. Eight pounds of this sample were mixed with 100 pounds of distilled water and 0.8 pound of finely divided diatomaceous earth in a mixing vessel at a temperature of about 190° F. The mixture was then passed under pressure through a coiled heat exchanger to obtain a solution having a temperature of 285° F. The heated fluid solution was then passed to a pressurized holding tank and retained in the holding tank at 285° F. for about 2 minutes. The heated fluid solution was then passed from the holding tank through a porous stainless steel filter under pressure at a temperature of about 270° F. The filtrate was then cooled to about 210° F. and incorporated with 200 pounds of acetone to precipitate solid amylose. The solid amylose was then dried under vacuum. The dried amylose was analyzed and found to contain 0.27% fat, 0.24% inorganic impurities, 0.03% nitrogen and no dimethyl sulfoxide insoluble impurities. This represents a fat removal of 87%, a nitrogen removal of 50%, an inorganic impurity removal of 31% and a dimethyl sulfoxide-insolubles impurity removal of 100%.

Descriptive information about seven additional examples is given in Table I. All of the examples are based on the same sample of amylose and the same general procedure used in Example I.

*Table I*

| Example No. | Percent Amylose | Solution Temperature | Percent Fat Removal | Percent N Removal | Percent DMS Insolubles Removal | Percent Inorganic Impurities Removal |
|---|---|---|---|---|---|---|
| 2 | 7.9 | 290 | 91 | 33 | 66 | 29 |
| 3 | 12.0 | 275 | 92 | 66 | 0 | 23 |
| 4 | 12.2 | 270 | 92 | 50 | 66 | 0 |
| 5 | 14.0 | 285 | 95 | 50 | 66 | 37 |
| 6 | 10.0 | 285 | 83 | 50 | 66 | 3 |
| 7 | 12.0 | 275 | 94 | 50 | 33 | 26 |
| 8 | 15.0 | 285 | 94 | 50 | 33 | 20 |

EXAMPLE IX

A sample of amylose obtained from corn starch was analyzed and found to contain 2.37% fat, 0.53% inorganic impurities, 0.08% nitrogen and 0.4% dimethyl sulfoxide insoluble impurities. 5.8 pounds of the sample were then mixed with 100 pounds of distilled water in a mixing vessel at a temperature of about 190° F. The aqueous mixture was then passed under pressure through a coiled heat exchanger to obtain a solution temperature of 270° F. The heated fluid solution was then passed to a pressurized holding tank and retained in the holding tank at about 270° F. for about 3 minutes. The heated fluid solution was then passed under pressure through a bed of Solka-floc, a fibrous wood cellulose type filter aid manufactured by Brown and Company, 500 Fifth Avenue, New York, New York. The filter aid was supported by a porous ceramic filter element. The filtrate was then cooled to 210° F. and roll dried to recover solid amylose. This procedure resulted in a fat reduction of 74%, a nitrogen reduction of 37%, a dimethyl sulfoxide insoluble impurity reduction of 50% and an inorganic impurity reduction of 30%.

EXAMPLE X 7.2 pounds of amylose from the sample referred to in Example I were added to 100 pounds of water in a heating vessel and the resulting mixture was heated to 200° F. To the heated mixture were then added 0.08 pounds diatomaceous earth and 0.04 pound finely divided activated carbon. The resulting mixture was then passed through a coil heat exchanger to obtain a solution temperature of 290° F. The heated fluid solution was then passed to a pressurized holding tank and retained in the holding tank for about 5 minutes at a temperature of about 270° F. The fluid solution was then passed through a porous stainless steel filter under pressure at about 270° F. The filtrate was cooled to about 210° F. and then corporated into 200 pounds of acetone to precipitate solid amylose. The solid amylose was then dried under vacuum. This procedure resulted in a fat removal of 87%, a nitrogen removal of 75%, a dimethyl sulfoxide insolubles removal of 50%, and an inorganic impurity removal of 43%.

EXAMPLE XI

A sample of impure amylose was treated utilizing the procedure of Example X with the exception that a mixture of bentonite clay and diatomaceous earth was utilized instead of a mixture of activated carbon and diatomaceous earth. Purification results similar to those of Example X were obtained.

EXAMPLE XII

Five pounds of starch obtained from high amylose corn and containing 70% by weight amylose were added to 45 pounds of water and the resulting mixture was heated to about 200° F. To the heated mixture was added 0.5 pound of diatomaceous earth. The resulting mxture wias passed through a coiled heat exchanger to obtain a solution temperature of 320° F. The heated fluid solution was then passed to a pressurized holding tank and retained in the holding tank for about 3.6 minutes at a temperature of about 290° F. The fluid solution was next passed through a porous stainless steel filter under pressure at about 270° F. The solution was cooled and solid high amylose starch was recovered. Purification results similar to those of Example X were obtained.

EXAMPLE XIII

Eight pounds of hydroxyethyl amylose, obtained by the reaction of ethylene oxide and amylose derived from corn starch, were added to 92 pounds of water and the resulting mixture was heated to about 160° F. To the heated mixture was added 0.8 pound of diatomaceous earth. The resulting mixture was heated in an open vessel to about 180° F. for about 5 minutes. The resulting fluid solution was then passed through a stainless steel filter, the solution during filtration having a temperature of about 150–170° F. The solution was cooled and solid hydroxyethyl amylose was recovered. Purification results similar to those of Example X were obtained.

About 95% of the amylose starting material is recovered by the procedures of the examples.

Now having described our invention, what we claim is:

1. A process for purifying amylose which comprises forming a fluid solution of the impure amylose in water at a concentration not in excess of 20% by weight, bringing said solution into contact with from 1 to 15% by weight of the amylose of a water-insoluble, amylose-inert, fat-sorbent filter aid, separating the said fluid solution from the said sorbent filter aid while maintaining a temperature at which the amylose remains in solution and recovering solid amylose from the separated fluid solution.

2. The method of claim 1 in which the filter aid is present while the amylose is being dissolved.

3. The method of claim 1 in which the filter aid is mixed with the solution after it is formed.

4. The method of claim 1 in which the solution is flowed through a prepared bed of the filter aid of a size such that each volume of the solution is brought into contact with from 1 to 15% filter aid by weight of the amylose.

5. A process for purifying amylose which comprises forming a fluid solution of impure amylose in water in the presence of water insoluble, amylose inert, fat-sorbent filter aid at a temperature ranging from 250° F. to temperatures at which amylose tends to degrade, the time at the temperature being limited to avoid degradation of the amylose, the amount of amylose being not more than about 20% by weight based on the weight of the water, the amount of sorbent filter aid being not less than 0.1% by weight based on the weight of the amylose, separating the sorbent filter aid from the fluid solution, the said separation being carried out at temperatures at which no solid amylose is formed, and recovering solid amylose from the fluid solution.

6. The process of claim 5, wherein the amount of sorbent filter aid ranges from about 1 to about 15% by weight.

7. The process of claim 6 wherein the sorbent filter aid is a diatomaceous earth.

8. The process of claim 6, wherein the sorbent filter aid is bentonite.

9. The process of claim 6, wherein the sorbent filter aid is a montmorillinite mineral.

10. The process of claim 6, wherein the sorbent filter aid is wood cellulose.

11. The process of claim 6, wherein the amylose is starch derived from high amylose corn containing at least 50% amylose.

12. A process for purifying amylose which comprises forming a fluid solution of impure amylose in water at a temperature ranging from 250° F. to temperatures at which amylose tends to degrade, treating the said fluid solution with a water-insoluble, amylose-inert, fat-sorbent filter aid at a temperature at which no solid amylose is formed, the temperature and time being limited to avoid degradation of the amylose, the amount of amylose being not more than about 20% by weight based on the weight of the water, the amount of sorbent filter aid being not less than 0.1% by weight based on the weight of the amylose, separating the sorbent filter aid from the fluid solution, the said separation being carried out at temperatures at which the amylose remains in solution and recovering solid amylose from the fluid solution.

13. The process of claim 12, wherein the amount of sorbent filter aid ranges from about 1 to about 15% by weight.

14. The process of claim 13, wherein the sorbent filter aid is diatomaceous earth.

15. The process of claim 13, wherein the sorbent filter aid is bentonite.

16. The process of claim 13, wherein the sorbent filter aid is a montmorillinite mineral.

17. The process of claim 13, wherein the sorbent filter aid is wood cellulose.

18. The process of claim 13, wherein the amylose is starch derived from high amylose corn containing at least 50% amylose.

References Cited by the Examiner

UNITED STATES PATENTS

| 614,293 | 11/1898 | Davidson et al. | 210—24 X |
| 1,701,092 | 2/1929 | Zoul | 210—24 X |
| 3,067,067 | 12/1962 | Etheridge et al. | 127—71 |

FOREIGN PATENTS

| 714,759 | 9/1954 | Great Britain. |

MORRIS O. WOLK, *Primary Examiner.*